(12) United States Patent
Fehler et al.

(10) Patent No.: US 9,604,544 B2
(45) Date of Patent: Mar. 28, 2017

(54) CABLE CONNECTOR

(71) Applicant: Phoenix Contact GMBH & Co. KG, Blomberg (DE)

(72) Inventors: Matthias Fehler, Detmold (DE); Thomas Fuhrer, Blomberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 24 days.

(21) Appl. No.: 14/371,998

(22) PCT Filed: Jan. 11, 2013

(86) PCT No.: PCT/EP2013/050465
§ 371 (c)(1),
(2) Date: Jul. 11, 2014

(87) PCT Pub. No.: WO2013/104746
PCT Pub. Date: Jul. 18, 2013

(65) Prior Publication Data
US 2014/0357113 A1 Dec. 4, 2014

(30) Foreign Application Priority Data
Jan. 12, 2012 (DE) ........................ 10 2012 100 235

(51) Int. Cl.
*B60L 11/18* (2006.01)
*B60L 3/00* (2006.01)
(Continued)

(52) U.S. Cl.
CPC ......... *B60L 11/1818* (2013.01); *B60L 3/0046* (2013.01); *H01R 13/639* (2013.01);
(Continued)

(58) Field of Classification Search
CPC .............. H01R 13/639; H01R 13/6397; H01R 13/6273; H01R 13/6275; H01R 13/635
See application file for complete search history.

(56) References Cited

U.S. PATENT DOCUMENTS 5,334,044 A     8/1994   Falossi et al.
5,350,312 A *   9/1994   Kuno .................. B60L 11/1818
                                                    439/310
(Continued)

FOREIGN PATENT DOCUMENTS

CN            101740947      6/2010
DE    10-2006-012762 A1   9/2007
(Continued)

OTHER PUBLICATIONS

Office Action issued by the German Patent and Trademark Office in German Application No. 10 2012 100 235.5 on May 22, 2015.
(Continued)

*Primary Examiner* — Truc Nguyen
(74) *Attorney, Agent, or Firm* — Knobbe, Martens, Olson & Bear LLP

(57) ABSTRACT

The subject matter of the invention is a cable connector (1) for establishing an electrical connection to a device connector, in particular a device connector of an electric vehicle or a charging device for the electric vehicle, wherein the cable connector (1) comprises a mechanical locking device (7), which is designed to lock the cable connector (1) to the device connector, and the locking device (7) is disposed at least partly on an outer side of a main body (2) of the cable connector (1), wherein the cable connector (1) has a covering device (14), which is designed to cover the locking device (7) at least partly on the outer side of the main body
(Continued)

(2), and the covering device (14) has an actuating region (16) for actuating the locking device (7) via the covering device (14).

11 Claims, 6 Drawing Sheets

(51) Int. Cl.
*H01R 13/639* (2006.01)
*H01R 13/627* (2006.01)

(52) U.S. Cl.
CPC .... *H01R 13/6392* (2013.01); *B60L 2240/667* (2013.01); *B60L 2270/32* (2013.01); *B60L 2270/34* (2013.01); *H01R 13/6275* (2013.01); *Y02T 10/7005* (2013.01); *Y02T 10/7072* (2013.01); *Y02T 10/7291* (2013.01); *Y02T 90/14* (2013.01); *Y02T 90/16* (2013.01)

(56) References Cited

U.S. PATENT DOCUMENTS

| | | | |
|---|---|---|---|
| 5,536,173 A * | 7/1996 | Fujitani | B60L 11/1818 439/321 |
| 5,556,284 A * | 9/1996 | Itou | B60L 11/1846 180/65.1 |
| 6,254,418 B1 * | 7/2001 | Tharp | H01R 13/6335 439/352 |
| 6,322,386 B1 * | 11/2001 | Tharp | H01R 13/633 439/344 |
| 6,976,876 B1 | 12/2005 | Su et al. | |
| 7,404,720 B1 * | 7/2008 | Frey | H01R 13/701 439/133 |
| 7,824,205 B2 | 11/2010 | Scislak | |
| 8,016,604 B2 * | 9/2011 | Matsumoto | B60L 3/0069 439/304 |
| 8,348,686 B1 * | 1/2013 | Huang | H01R 13/6272 439/133 |
| 8,506,315 B2 * | 8/2013 | Canedo | H01R 13/60 439/310 |
| 2010/0197171 A1 | 8/2010 | Matsumoto et al. | |
| 2011/0034053 A1 * | 2/2011 | Matsumoto | B60L 3/0069 439/304 |
| 2011/0070758 A1 | 3/2011 | Poulin et al. | |
| 2013/0130532 A1 * | 5/2013 | Canedo | H01R 13/60 439/345 |

FOREIGN PATENT DOCUMENTS

| | | |
|---|---|---|
| DE | 10-2009-014296 A1 | 9/2010 |
| DE | 10 2009 044 179 A1 | 12/2010 |
| DE | 10 2010 041 229 A1 | 6/2011 |
| WO | WO 2010/060370 A1 | 6/2010 |
| WO | 2011-124563 A1 | 10/2011 |

OTHER PUBLICATIONS

International Search Report dated Jan. 2, 2014, for PCT Application No. PCT/EP2013/050465—in 7 pages.
Office Action issued by the SIPO on Sep. 14, 2015 in Chinese Application No. 201380004921.9.

* cited by examiner

CABLE CONNECTOR

REFERENCE TO RELATED APPLICATIONS

This application is the U.S. National Phase of International Application PCT/EP2013/050465, filed Jan. 11, 2013, and claims priority to DE Application No 10 2012 100 235.5, filed Jan. 12, 2012. Each of the priority applications is hereby incorporated by reference in its entirety.

FIELD

The invention relates to a cable connector for establishing an electrical connection to a device connector, in particular a device connector of an electric vehicle or a charging device for the electric vehicle, wherein the cable connector comprises a mechanical locking device, which is designed to lock the cable connector to the device connector, and the locking device is disposed at least partly on an outer side of a main body of the cable connector.

BACKGROUND

Such cable connectors are known from DE 10 2010 017 458 A1, for example, for establishing an electrical connection to a device connector of an electric vehicle or a charging device for the electric vehicle. As the number of electric vehicle increases, it has become necessary to provide easily implemented means for recharging the batteries of the electric vehicles. Charging stations have been developed for this purpose, at which electric automobiles can be "filled" with current in a manner similar to that implemented at conventional filling stations, where automobiles are filled with gasoline or diesel fuel.

For "filling", the electric automobile is connected to the charging station by a cable, which can be fixedly connected either to the electric automobile or the charging station, but which must have plug-in capability on the other side. In order to provide this plug-in capability, cable connectors have been developed that can be handled easily and reliably by laypersons, thereby ensuring that said cable connectors can be used, in particular, without posing a danger to the user. These cable connectors are intended to be easy for anyone to plug in and unplug, in particular.

This also applies, in particular, for relatively weak persons, who must also be capable of easily and safely handling such a connector with the electric cable mounted thereon.

The cable connector known from DE 10 2010 017 458 A1 comprises a main body having a plug-in section and a handle, wherein the plug-in section and the handle extend approximately perpendicularly to one another. At the lower end of the handle, the cable is inserted into the main body, thereby enabling the cable to be routed within the main body, i.e. through the handle, to the plug-in section, where said cable is electrically contacted to the electrical contacts of the electric plug. The cable connector can therefore be handled in a manner similar to a pistol such that support is provided for the plugging-in and unplugging of the charging connector in the horizontal direction. Cable connectors therefore often have a shape corresponding to that of a dispensing valve of a fuel dispenser or even the shape of a pistol.

In the case of these cable connectors it has proven advantageous to design said cable connectors with a locking device. This locking device establishes a reliable connection between the cable connector and the device connector. Therefore, the existing connection between the plug-and-socket connectors, i.e. between the electric vehicle and the charging device, cannot be interrupted unintentionally, thereby preventing damage to the electric vehicle, for example when the charging procedure of the vehicle accumulator is not yet fully completed. Damage of this type can cause the vehicle accumulator to age prematurely or to even become completely destroyed and thereby necessitate costly replacement thereof. At the same time, the operation of the charging station can be coupled to the lock of the locking device in order to additionally increase the safety.

Such a mechanical locking device comprises, for example, a tilt lever, which is resiliently supported and, by means of one lever end, can establish a locked state with the device connector. The other lever end, when actuated, can release the locked state and make it easier to establish the locked state. The function of the mechanical locking device must be ensured for different weather conditions in order to ensure that the charging stations can be operated in open spaces. It is therefore known, for example, to provide drainage channels in the cable connector in order to effectively bleed off moisture. A residual quantity of water can remain in the cable connector, however, which, in the frozen state, can impair the function of the locking device or damage or even destroy the cable connector. It has also been shown that snow and ice can form in or on the cable connector, which can impair the function of the locking device. The region of the tilt lever intended for actuation of the locking device, in particular, is susceptible to penetration by moisture, snow and/or ice.

Proceeding from this situation, the problem addressed by the invention is that of providing a cable connector of this type for establishing an electrical connection to a device connector, in particular a device connector of an electric vehicle or a charging device for the electric vehicle, in the case of which the function of the cable connector is ensured under different weather conditions, and which permits easy actuation of the locking device.

SUMMARY

The problem is solved, according to the invention, by the subjects of the independent claims. Advantageous embodiments of the invention are mentioned in the subclaims.

According thereto, the problem addressed by the invention is solved by a cable connector for establishing an electrical connection to a device connector, in particular a device connector of an electric vehicle or a charging device for the electric vehicle, wherein the cable connector comprises a mechanical locking device, which is designed to lock the cable connector to the device connector, and the locking device is disposed at least partly on an outer side of a main body of the cable connector, wherein the cable connector has a covering device, which is designed to cover the locking device at least partly on the outer side of the main body, and the covering device has an actuating region for actuating the locking device via the covering device.

The invention therefore makes it possible for the locking device to be actuated as usual, wherein, according to the invention, the actuation takes place via the actuating region of the covering device. The covering device is preferably designed such that said covering device prevents moisture, ice, and snow from entering the cable connector, in particular the locking device. The covering device can therefore be designed as a protective coating. The actuating region can be the entire region of the covering device or merely one part thereof. In the event that the actuating region is one part of the covering device, transitions between the areas are designed such that said transitions prevent entry by moisture, snow, and ice. As a result, even when temperatures fall below the freezing point, moisture within the cable connector cannot impair or even block the locking device. In addition, snow and ice are prevented from acting on the cable connector and/or the locking device. Insofar that current flowing through the cable connector generates heat, this heat can cause ice and/or snow located on and/or in the cable connector to melt. The resultant melt water cannot enter the cable connector, thereby ensuring that, after the charging procedure has ended and the cable connector has started to cool, moisture does not enter the cable connector, in particular in the region of the locking device, and cannot freeze over and impair the use of the cable connector. The cable connector can be designed as a female or male connector for connection to the device connector. A mixed design is also possible, if the cable connector has a plurality of electrical contacts.

In an advantageous embodiment of the invention, the actuating region of the covering device is made of an elastically and/or plastically deformable material and, for the rest, is made of a dimensionally stable material. Every transition between the elastic region and the remaining region or regions is preferably moisture-impermeable. The dimensionally stable material provides reliable protection of the cable connector against mechanical loads and vandalism. The actuating region is preferably designed to be as small as possible in order to increase the stability of the covering device.

In an advantageous embodiment of the invention, the dimensionally stable material is a plastic, in particular a hard plastic. The use of hard plastic provides reliable protection of the cable connector against mechanical loads and vandalism. The use of hard plastic is also preferred due to the electrically insulating effect thereof.

In an advantageous embodiment of the invention, the covering device is made of an elastically and/or plastically deformable material. The actuating area therefore comprises the entire covering device. This covering device can preferably be produced as a single piece, thereby resulting in a simple manufacturing process. Due to the deformability thereof, the covering device can be stretched onto the main body of the cable connector, thereby providing a seal against penetration by moisture, snow, and ice.

In an advantageous embodiment of the invention, the deformable material is a rubber material. Rubber is a suitable deformable material due to the sealing effect and deformability thereof. In addition, rubber, as an insulator, is well suited for use with the cable connector.

In an advantageous embodiment of the invention, the covering device is detachably held on the main body. This makes it possible to replace the covering device separately in the event of damage. In addition, the covering device can be removed in order to perform maintenance on or clean the cable connector, and can be reinstalled. The covering device is preferably inserted onto the main body. In addition or as an alternative thereto, the covering device can be fixedly installed on the main body using mounting means, for example in the form of screws. The covering device is preferably designed such that said covering device can be installed on the main body of a known cable connector that does not have a covering device. It is therefore possible to retrofit any cable connector.

In an advantageous embodiment of the invention, the covering device and the main body comprise corresponding guide elements, which are disposed such that the covering device can be connected to the main body by being slid thereon. Since the covering device can be slid on, said covering device can be quickly installed on the main body. The covering device can also be slid on without the use of tools. The guide elements are preferably disposed as corresponding grooves and projections. The arrangement of grooves and projections on the main body or the covering device is basically exchangeable. The guide elements are designed as single pieces or in a plurality of sections. The number of corresponding guide elements is basically arbitrary. The guide elements are preferably positioned in at least one edge region of the covering device. In addition, the covering device, in the slid-on state, can be fixedly installed on the main body using mounting means, for example in the form of screws.

In an advantageous embodiment of the invention, sealing means are provided in order to seal the transition between the covering device and the main body against penetration by moisture. The sealing means can be installed either on the main body or on the sealing device. In principle, sealing means can also be designed as a separate component clamping between the main body and the covering device. The sealing means preferably comprise a sealing ring, which extends around an edge region of the covering device. The sealing ring is preferably designed as a rubber ring.

In an advantageous embodiment of the invention, the locking device is formed at least partly on a top side of the main body and the covering device is designed as a cap that covers the top side of the main body. The cable connector usually must be in a certain orientation to be connected to the device connector in order to ensure that only corresponding contacts can be connected to one another. As a result, the top side of the cable connector results as the side that points upward in the state connected to the device connector. Due to typical overall heights of motor vehicles, it is appropriate for ergonomic reasons to design the locking device to be actuated on the top side of the cable connector, for example being designed for actuation by means of a thumb. As a result, however, the locking device is susceptible to atmospheric influences in the form of precipitation. The cap can provide effective protection of the top side of the cable connector.

In an advantageous embodiment of the invention, the guide elements of the main body are formed along two opposing side edges, in particular along the longitudinal edges, of the top side. The cap is therefore slid substantially over the entire top side of the main housing. The cap is preferably slid from a side that faces away from the device connector in the connected state.

In an advantageous embodiment of the invention, the cable connector comprises snap-in means, with which the covering device can snap into place with the main body. The snap-in means are preferably designed as snap-in projections, which engage behind corresponding recesses or the like. The locked state can be released in order to separate the covering device from the main body. The snap-in means can be formed on the main body and/or on the covering device.

In addition, the aforementioned cable connector is intended for use to charge an electric vehicle.

The invention is described in greater detail in the following by reference to the attached drawings and preferred embodiments.

DETAILED DESCRIPTION

Figure 1:
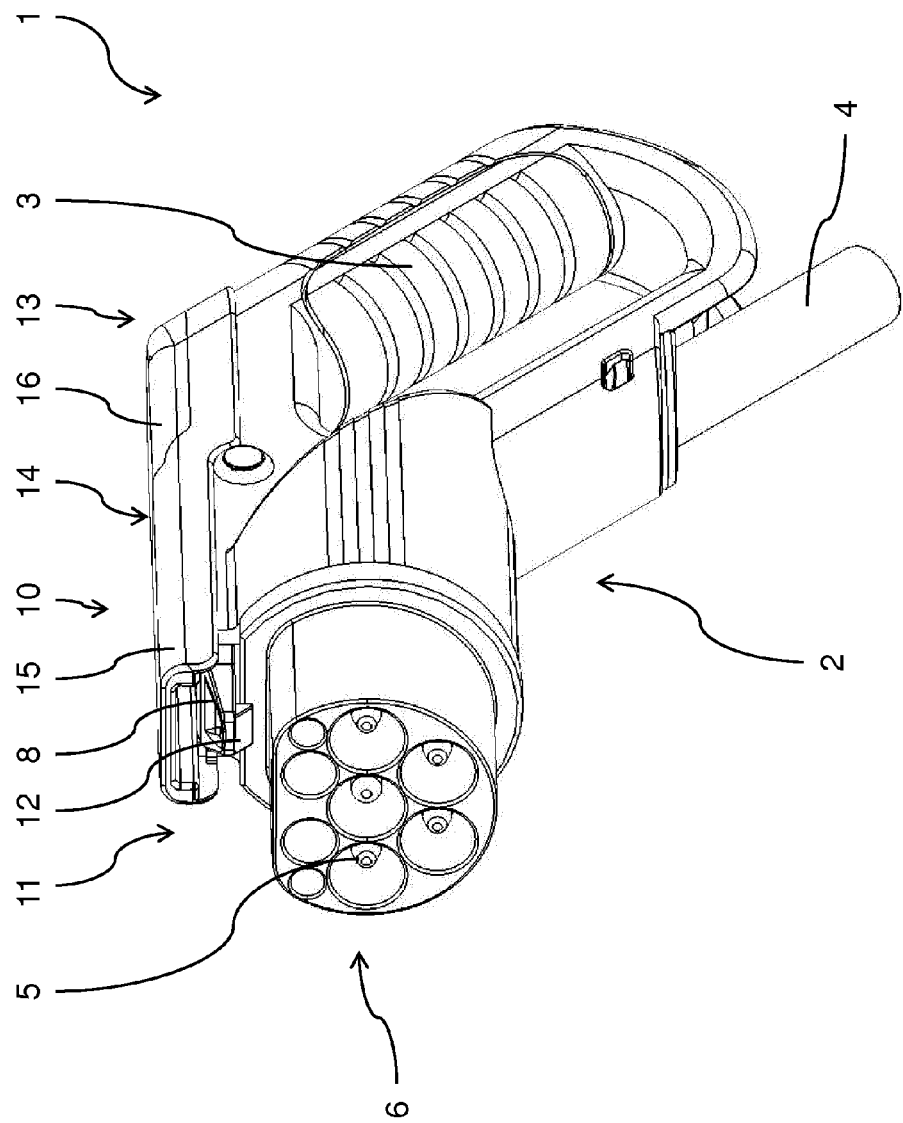
FIG. 1 shows a cable connector according to a preferred embodiment of the invention in a perspective view.
Figure 2:
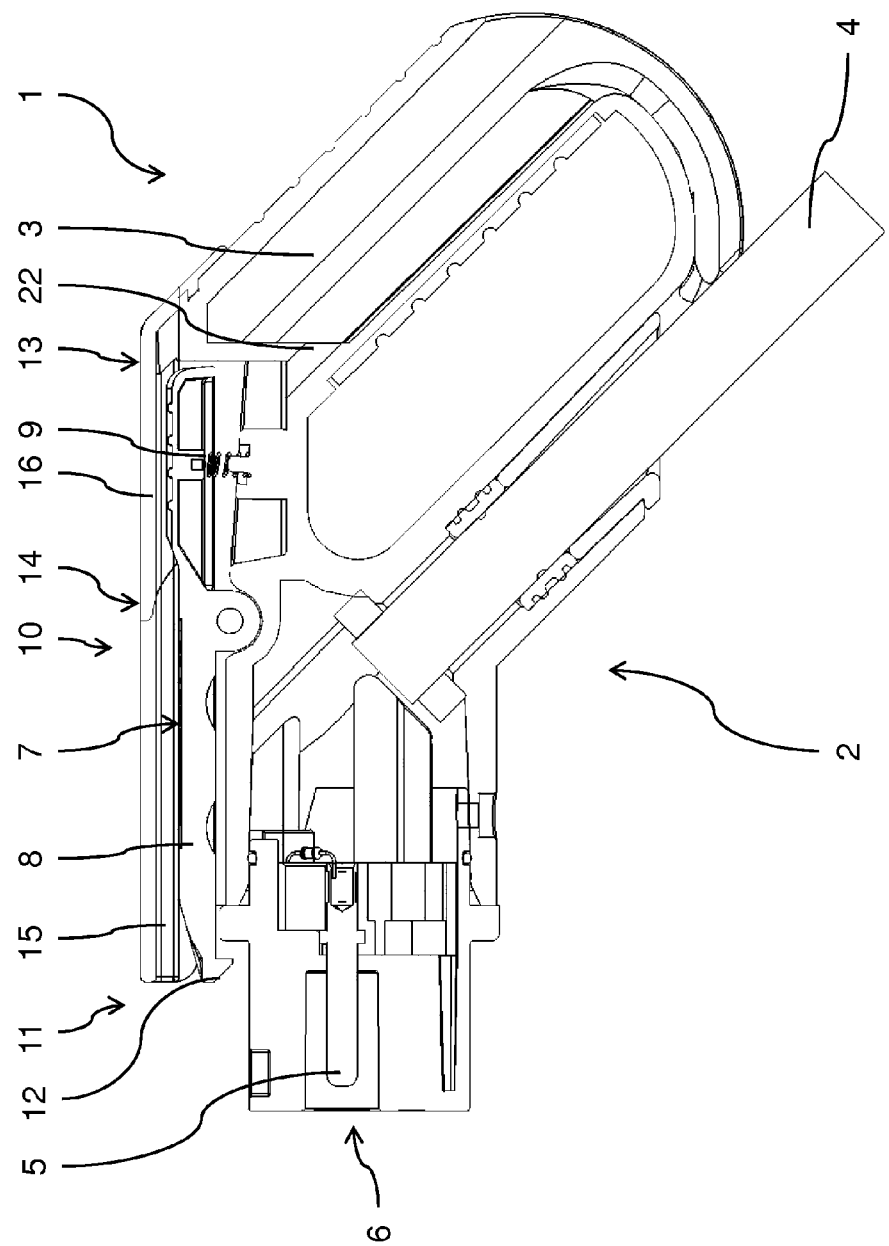
FIG. 2 shows the cable connector from FIG. 1 in a sectional view from the side.
Figure 3:
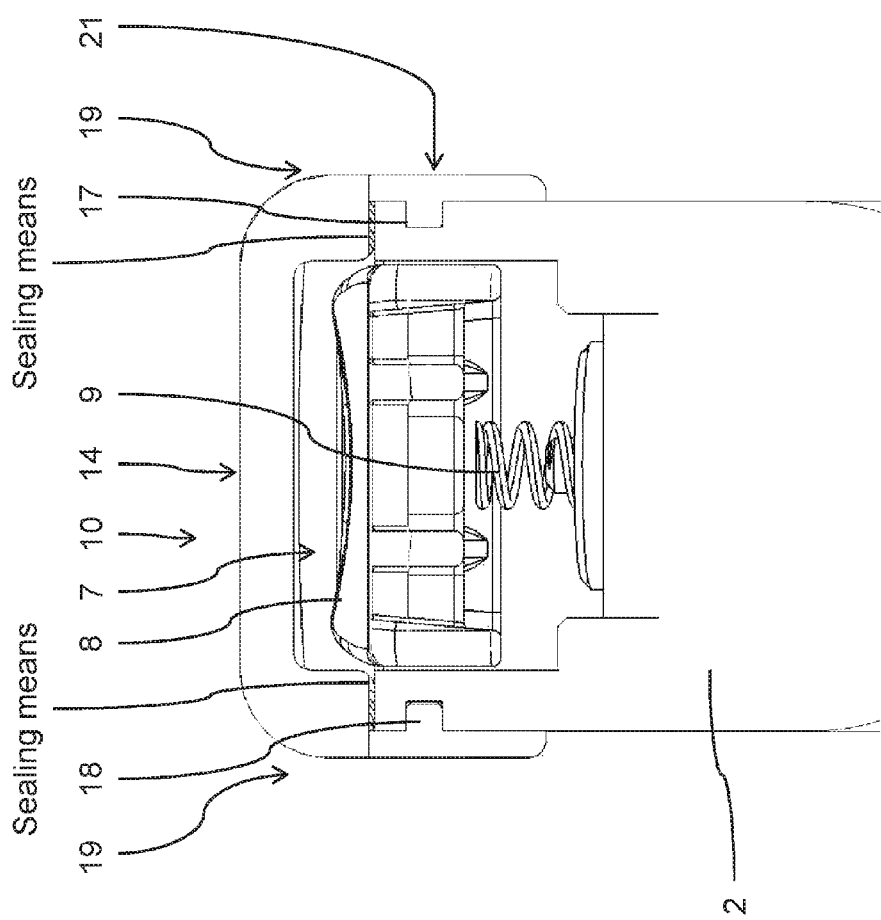
FIG. 3 shows a detailed view of the cable connector from FIG. 1 in a sectional view from the front.
Figure 4:
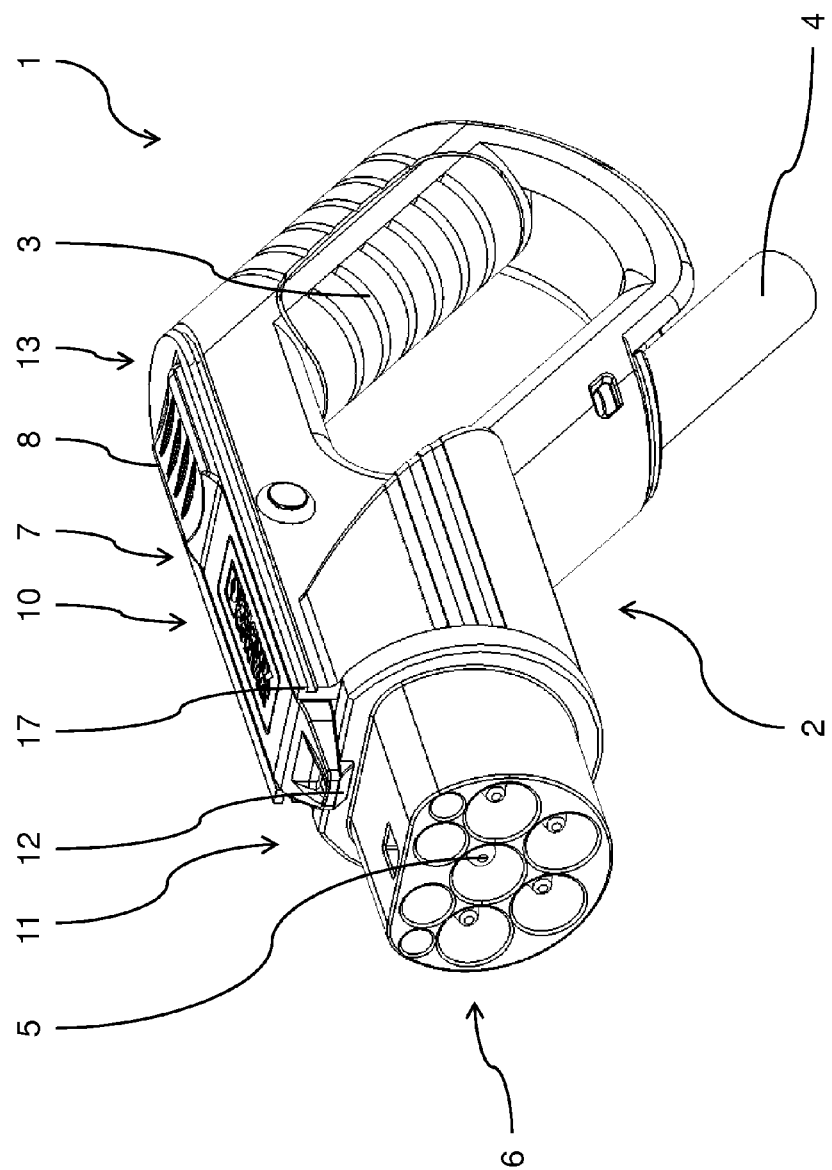
FIG. 4 shows the view from FIG. 1, without the covering device.

FIGS. 1 to 4 show a cable connector 1 according to a preferred embodiment of the invention. The cable connector 1 comprises a main body 2 having a grip part 3, into which a connecting cable 4 is inserted, as shown in detail in FIG. 2.

The cable connector 1 is provided for establishing an electrical connection between an electric vehicle and a charging device, wherein the cable connector 1 can be connected to a corresponding device connector, which is not shown here, to form a plug-in connector arrangement. The cable connector 1 is held on the grip part 3 in order to establish the plug-in connection. The connection cable 4 can comprise a cable connector 1 at each end, wherein the connecting cable 4 can then be connected, by means of the cable connectors 1 thereof, to a device connector dedicated to the electric vehicle and to a device connector dedicated to the charging device in order to establish an electrical connection between the electric vehicle and the charging device, for example to charge a vehicle accumulator dedicated to the electric vehicle.

The cable connector 1 comprises a plurality of electrical contacts 5, which are designed as connector pins or bushing pins in the present case and form a plug face 6. In order to ensure that the cable connector 1 can enter into a connection with a device connector—which is not shown in the figures—which is not only non-positive but also form-fit in the plugged-in state, the cable connector 1 comprises a mechanical locking device 7, which has a two-armed safety catch 8, which is resiliently supported by means of a compression spring 9. The safety catch 8 is mounted on the outside on a top side 10 of the main body 2 and, at the end 11 facing the device connector in the connected state, comprises a snap-in hook 12, in order to lock the cable connector 1 to the device connector. The locking device 7 is actuated by pressing from the top side 10 onto the safety catch 8 in the region of the end 13 facing away from the device connector in the connected state, whereby the compression spring 9 is compressed and the cable connector 1 and the device connector can be easily connected or separated.

Figure 5:
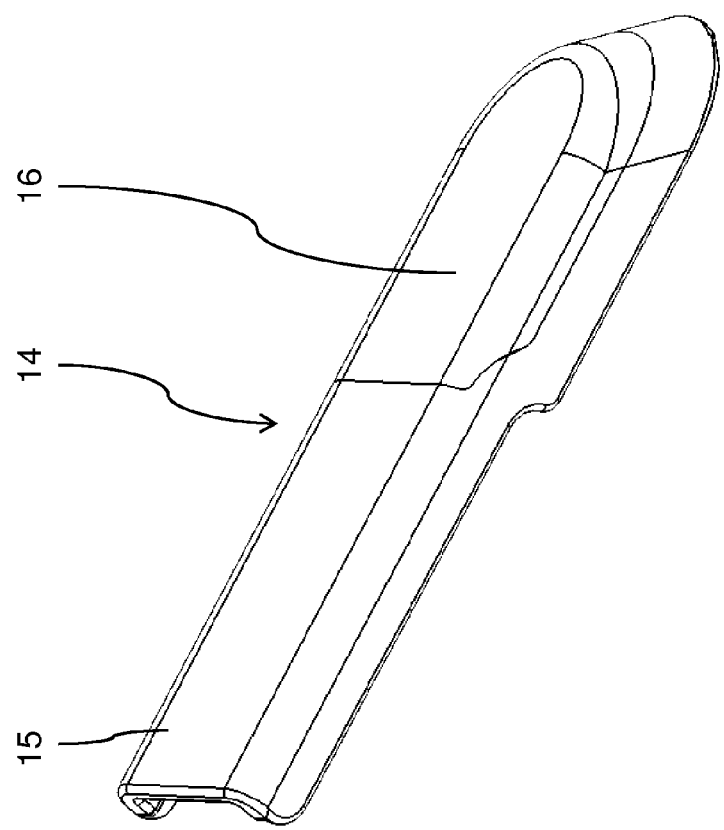
FIG. 5 shows the covering device of the cable connector from FIG. 1 in a perspective view at an angle from above.
Figure 6:
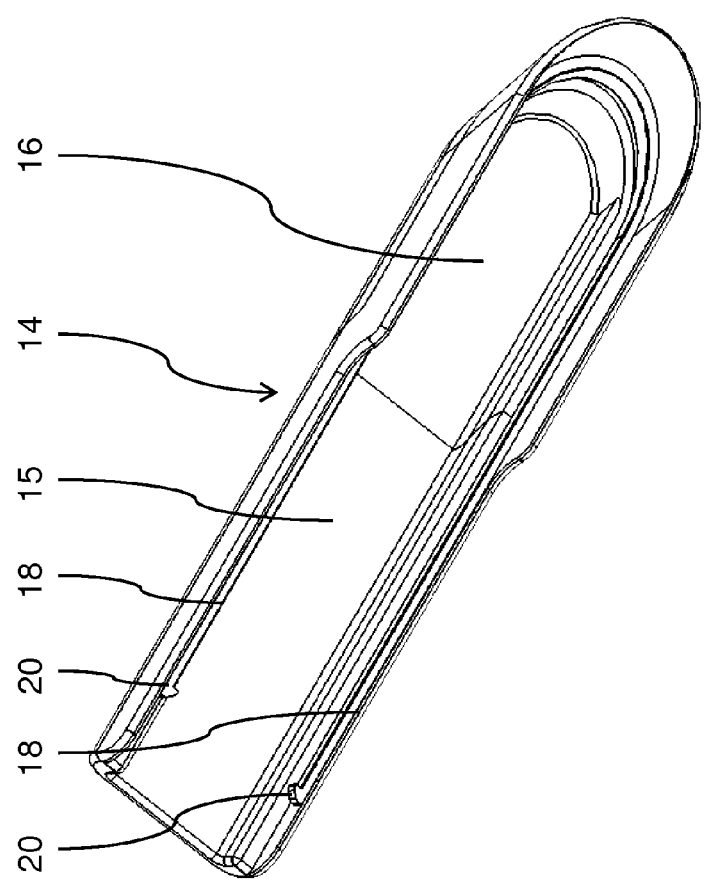
FIG. 6 shows the covering device from FIG. 5 in a perspective view at an angle from below.

The cable connector 1 comprises a covering device 14, which is shown individually in FIGS. 5 and 6. The covering device 14 is designed as a protective cap, which covers the top side 10 of the main body 2 having the locking device 7. The covering device 14 comprises a main body 15 and an actuating region 16, which are connected to one another in a moisture-impermeable manner. The main body 15 is made of a dimensionally stable material, which is a hard plastic in this embodiment. The actuating region 16 is made of an elastically and/or plastically deformable rubber material, in order to permit the locking device 7 to be actuated by the covering device 14. Upon actuation of the locking device 7, the actuating region 16 deforms, thereby allowing the safety catch 8 on the end 13 facing away from the device connector to be actuated.

The covering device 14 and the main body 2 comprise corresponding guide elements 17, 18, which are designed as grooves 17 and projections 18. Two grooves 17 extend along the upper longitudinal edges 19 of the main body 2, and the projections 18 extend in the longitudinal direction of the covering device 14 at the lower edge region thereof. The covering device 14 is therefore detachably connectable to the main body 2 by being slid thereon.

The projections 18 each comprise a snap-in projection 20 on the end 11 thereof facing the device connector. The covering device 14 is slid onto the main body 2 from the end 13 of the main body 2 facing away from the device connector. In the slid-on state, the snap-in projections 20 engage behind the grooves 17 on the lengthwise-end thereof, whereby the covering device 14 securely snaps into place with the main body 2 and is held thereon. The covering device 14 can be slid off of the main body 2 by releasing the snap-in connection.

The cable connector 1 comprises, as sealing means, a non-illustrated rubber seal, which is disposed in the connection region 21 between the covering device 14 and the main body 2, and seals the transition between the covering device 14 and the main body 2 against penetration by moisture.

In the event that moisture does enter, a drainage channel 22 is additionally formed in the grip part 3, in order to guide the moisture out of the main body 2.

LIST OF REFERENCE CHARACTERS cable connector 1
main body 2
grip part 3
connecting cable 4
electrical contact 5
plug face 6
locking device 7
safety catch 8
spring 9
top side 10
end facing the device connector 11
snap-in hook 12
end facing away from the device connector 13
covering device 14
main body 15
actuating region 16
guide element, groove 17
guide element, projection 18
longitudinal edge 19
snap-in projection 20
connection region 21
drainage channel 22

The invention claimed is:

1. A cable connector for establishing an electrical connection to a device connector of an electric vehicle or a charging device for the electric vehicle, wherein:
    the cable connector comprises a mechanical locking device, which is designed to lock the cable connector to the device connector,
    the locking device comprises a tilt lever, which is resiliently supported, and
    the locking device is disposed at least partly on an outer side of a main body of the cable connector,
    characterized in that:

the cable connector has a covering device, which is designed to cover the locking device at least partly on the outer side of the main body of the cable connector, the covering device has an actuating region for actuating the locking device via the covering device and a main body of the covering device, which are connected to one another in a moisture-impermeable manner, and the actuating region of the covering device is made of an elastically and/or plastically deformable material and remaining regions are made of a dimensionally stable material.

2. The cable connector according to claim 1, characterized in that the dimensionally stable material is a plastic, in particular a hard plastic.

3. The cable connector according to 1, characterized in that the deformable material is a rubber material.

4. The cable connector according to claim 1, characterized in that the covering device is detachably held on the main body of the cable connector.

5. The cable connector according to claim 4, characterized in that the covering device and the main body of the cable connector comprise corresponding guide elements, which are disposed such that the covering device can be connected to the main body of the cable connector by being slid on.

6. The cable connector according to claim 1, characterized in that a transition between the covering device and the main body of the cable connector is sealed against penetration by moisture.

7. The cable connector according to claim 1, characterized in that:

the locking device is disposed at least partly on a top side of the main body of the cable connector, and the covering device is designed as a cap, which covers the top side of the main body of the cable connector.

8. The cable connector according to claim 5, characterized in that:

the locking device is disposed at least partly on a top side of the main body of the cable connector, the covering device is designed as a cap, which covers the top side of the main body of the cable connector, and the guide elements of the main body of the cable connector are formed along two opposing side edges, in particular along the longitudinal edges, of the top side.

9. The cable connector according to claim 1, characterized in that the cable connector comprises snap-in means, with which the covering device can snap into place with the main body of the cable connector.

10. The use of a cable connector according to claim 1 for charging an electric vehicle.

11. A cable connector for establishing an electrical connection to a device connector, in particular a device connector of an electric vehicle or a charging device for the electric vehicle, wherein:

the cable connector comprises a mechanical locking device, which is designed to lock the cable connector to the device connector, and the locking device is disposed at least partly on an outer side of a main body of the cable connector, characterized in that:

the cable connector has a covering device, which is designed to cover the locking device at least partly on the outer side of the main body, the covering device has an actuating region for actuating the locking device via the covering device, the covering device and the main body comprise corresponding guide elements, which are disposed such that the covering device can be connected to the main body by being slid on, the locking device is disposed at least partly on a top side of the main body, the covering device is designed as a cap, which covers the top side of the main body, and the guide elements of the main body are formed along two opposing side edges, in particular along the longitudinal edges, of the top side.

* * * * *